(12) United States Patent
Purane et al.

(10) Patent No.: US 12,286,089 B2
(45) Date of Patent: Apr. 29, 2025

(54) ELECTRIC PARKING BRAKE DEVICE

(71) Applicants: Hitachi Astemo, Ltd., Ibaraki (JP); Hitachi Astemo Ueda, Ltd., Nagano (JP)

(72) Inventors: Sandip Purane, Ibaraki (JP); Yasuhiro Yamamoto, Ibaraki (JP); Mari Takahashi, Nagano (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 426 days.

(21) Appl. No.: 17/910,635

(22) PCT Filed: Dec. 18, 2020

(86) PCT No.: PCT/JP2020/047372
§ 371 (c)(1),
(2) Date: Sep. 9, 2022

(87) PCT Pub. No.: WO2021/181808
PCT Pub. Date: Sep. 16, 2021

(65) Prior Publication Data
US 2023/0166703 A1   Jun. 1, 2023

(30) Foreign Application Priority Data

Mar. 12, 2020   (JP) .................. 2020-043290

(51) Int. Cl.
*F16D 51/00*   (2006.01)
*B60T 1/06*   (2006.01)
(Continued)

(52) U.S. Cl.
CPC .............. *B60T 8/885* (2013.01); *B60T 1/067* (2013.01); *B60T 13/746* (2013.01); *B60T 17/22* (2013.01);
(Continued)

(58) Field of Classification Search
CPC .......... F16D 51/22; F16D 65/22; F16D 65/52; F16D 66/00; F16D 2066/003;
(Continued)

(56) References Cited

U.S. PATENT DOCUMENTS

2014/0020997 A1* 1/2014 Bach ............... F16D 51/46
188/325
2017/0343070 A1* 11/2017 Schwartz ........... F16D 65/22
(Continued)

FOREIGN PATENT DOCUMENTS

| EP | 3 418 142 | 12/2018 |
|---|---|---|
| JP | 2016-175587 | 10/2016 |
| JP | 2021160475 A | * 10/2021 |

OTHER PUBLICATIONS

English abstract for JP-2021160475 (no date).*

(Continued)

*Primary Examiner* — Nicholas J Lane
(74) *Attorney, Agent, or Firm* — Wenderoth, Lind & Ponack, L.L.P.

(57) ABSTRACT

Provided is an electric parking brake device in which a drum brake includes braking gap automatic adjustment means and a parking brake lever, and the operation of an electric actuator that drives the parking brake lever is controlled by a control unit. When an application operation time of the electric actuator (38) by the time when a parking brake state is obtained has exceeded a predetermined application operation end determination time (T2), the control unit (C) determines that the braking gap automatic adjustment means (18) is abnormal. With this configuration, at the time of obtaining the parking brake state, the presence or absence of abnormality in the braking gap automatic adjustment means can be determined.

3 Claims, 5 Drawing Sheets

(51) Int. Cl.
  *B60T 8/88*   (2006.01)
  *B60T 13/74*  (2006.01)
  *B60T 17/22*  (2006.01)
  *F16D 51/22*  (2006.01)
  *F16D 65/22*  (2006.01)
  *F16D 65/52*  (2006.01)
  *F16D 66/00*  (2006.01)
  *F16D 121/24* (2012.01)

(52) U.S. Cl.
  CPC ............. *F16D 51/22* (2013.01); *F16D 65/22* (2013.01); *F16D 65/52* (2013.01); *F16D 66/00* (2013.01); *F16D 2066/003* (2013.01); *F16D 2121/24* (2013.01)

(58) Field of Classification Search
  CPC ...... F16D 2121/24; B60T 8/885; B60T 1/067; B60T 13/746; B60T 17/22
  See application file for complete search history.

(56) References Cited

U.S. PATENT DOCUMENTS

2019/0135259 A1\* 5/2019 Jo ........................... B60T 7/085
2022/0032894 A1\* 2/2022 Park ...................... B60T 13/588
2023/0166703 A1\* 6/2023 Purane ................. B60T 13/741
                                                                188/327

OTHER PUBLICATIONS

International Search Report issued Feb. 22, 2021 in International Application No. PCT/JP2020/047372 with translation.
Written Opinion of the International Searching Authority issued Feb. 22, 2021 in International Application No. PCT/JP2020/047372 with translation.
Extended European Search Report issued Sep. 22, 2023 in corresponding European Patent Application No. 20924799.8.

\* cited by examiner

ELECTRIC PARKING BRAKE DEVICE

TECHNICAL FIELD

The present invention relates to an electric parking brake device, including: a drum brake including: braking gap automatic adjustment means for automatically adjusting a gap between a pair of brake shoes and a brake drum; and a parking brake lever configured to operate between an operation position for obtaining a parking brake state by bringing the pair of brake shoes into slide contact with the brake drum and a non-operation position for releasing the parking brake state; an electric actuator configured to exert power for driving the parking brake lever; and a control unit configured to control the operation of the electric actuator.

BACKGROUND ART

Such electric parking brake device has been known from Patent Literature 1.

CITATION LIST

Patent Literature

PTL 1: JP 2016-175587 A

SUMMARY OF INVENTION

Technical Problem

In the electric parking brake device disclosed in Patent Literature 1 mentioned above, a parking brake lever is coupled to one of a pair of brake shoes, and another brake shoe operates to expand through braking gap automatic adjustment means in association with the operation of the parking brake lever, to thereby obtain a parking brake state. However, when there is abnormality in the braking gap automatic adjustment means, the gap between the brake shoes and the brake drum becomes excessively larger. As a result, even when the parking brake lever is driven to an operation position side by an electric actuator, a required parking brake force may not be obtained or it may take time to obtain the parking brake state. Accordingly, it is required to check whether or not the braking gap automatic adjustment means normally operates.

The present invention has been made in view of the above-mentioned circumstances, and has an object to provide an electric parking brake device capable of determining the presence or absence of abnormality in braking gap automatic adjustment means at the time of obtaining a parking brake state.

Solution to Problem

In order to achieve the object described above, the present invention has a first feature that there is provided an electric parking brake device, including: a drum brake including: braking gap automatic adjustment means for automatically adjusting a gap between a pair of brake shoes and a brake drum; and a parking brake lever configured to operate between an operation position for obtaining a parking brake state by bringing the pair of brake shoes into slide contact with the brake drum and a non-operation position for releasing the parking brake state; an electric actuator configured to exert power for driving the parking brake lever; and a control unit configured to control the operation of the electric actuator, wherein, when an application operation time of the electric actuator by a time when the parking brake state is obtained has exceeded a predetermined application operation end determination time, the control unit determines that the braking gap automatic adjustment means is abnormal.

Further, in addition to the configuration of the first feature, the present invention has a second feature of including current detection means for detecting an energization current to the electric actuator, wherein, when a detection value by the current detection means of an inrush current generated in response to the start of the operation of the electric actuator has exceeded a predetermined current threshold, the control unit performs abnormality determination of the braking gap automatic adjustment means.

Still further, in addition to the configuration of the second feature, the present invention has a third feature that, when the detection value by the current detection means of the inrush current is equal to or less than the current threshold, and the control unit determines that the application operation time from a start of an application operation of the electric actuator has exceeded a predetermined inrush current abnormality determination time, the control unit initializes the abnormality determination of the braking gap automatic adjustment means.

Advantageous Effects of Invention

According to the first feature of the present invention, when the application operation elapsed time of the electric actuator by the time when the parking brake state is obtained at the time of the application operation of the electric actuator for obtaining the parking brake state has exceeded the application operation determination time, the control unit determines that the braking gap automatic adjustment means is abnormal. As a result, the presence or absence of abnormality in the braking gap automatic adjustment means can be determined at the time of obtaining the parking brake state, and the maintenance of the braking gap automatic adjustment means can be quickly performed.

In addition, according to the second feature of the present invention, when the inrush current generated in response to the start of the operation of the electric actuator has exceeded the current threshold, the abnormality determination of the braking gap automatic adjustment means is performed. As a result, it is possible to perform the abnormality determination of the braking gap automatic adjustment means under a state in which the inrush current is normally generated, and it is possible to differentiate the abnormality determination from the abnormality determination caused by the failure of the electric actuator or the like.

Further, according to the third feature of the present invention, when the inrush current is equal to or less than the current threshold, and it is determined that the inrush current elapsed time has exceeded the inrush current determination time, the abnormality determination of the braking gap automatic adjustment means is initialized. As a result, it is possible to avoid the abnormality determination of the braking gap automatic adjustment means under a state in which an abnormal inrush current is generated due to the failure of the electric actuator or the like.

Figure 1:
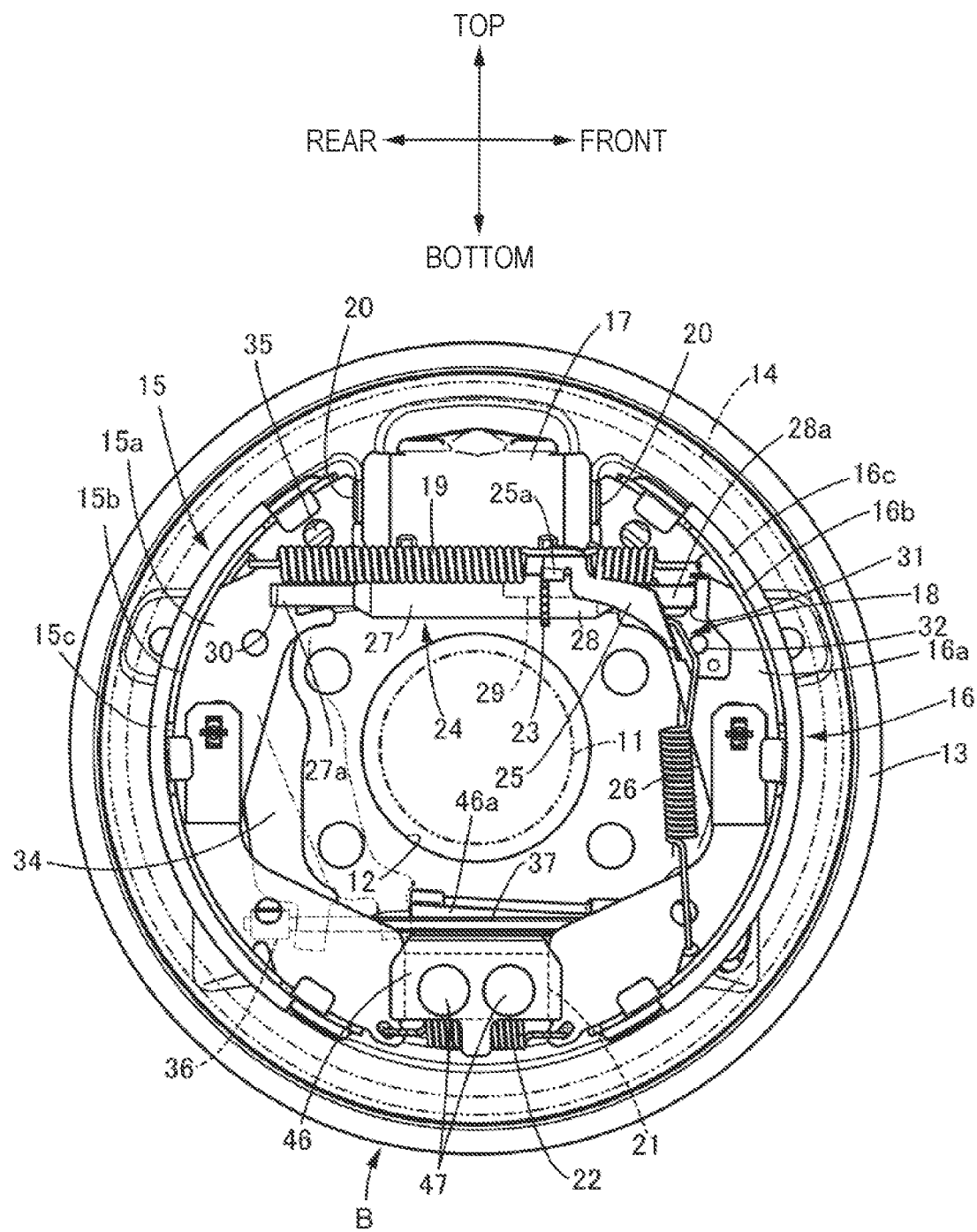
FIG. 1 is a front view of a drum brake device (first embodiment).

REFERENCE SIGNS LIST 14 brake drum
15, 16 brake shoe
18 braking gap automatic adjustment means
34 parking brake lever
38 electric actuator
64 current detection means
A0 current threshold
B drum brake
C control unit
T1 inrush current abnormality determination time
T2 application operation end determination time

DESCRIPTION OF EMBODIMENT

An embodiment of the present invention is described with reference to the accompanying FIG. 1 to FIG. 5.

First Embodiment

First, in FIG. 1, a drum brake B is provided on a vehicle wheel of a four-wheeled vehicle, for example, a left rear wheel, and the drum brake B includes: a fixed back plate 13 having, in a center portion, a through hole 12 for allowing an axle 11 of the left rear wheel to pass therethrough; first and second brake shoes 15 and 16 arranged in the back plate 13 to be brought into slide contact with an inner periphery of a brake drum 14 that rotates together with the left rear wheel; a wheel cylinder 17 fixed to the back plate 13 to exert a force for causing the first and second brake shoes 15 and 16 to operate to expand; braking gap automatic adjustment means (so-called auto adjuster) 18 for automatically adjusting the gap between the first and second brake shoes 15 and 16 and the brake drum 14; and return springs 19 provided between the first and second brake shoes 15 and 16.

The first and second brake shoes 15 and 16 include: first and second webs 15a and 16a each formed in a bow-like flat plate shape along the inner periphery of the brake drum 14; first and second rims 15b and 16b formed continuously from the first and second webs 15a and 16a to be orthogonal to outer peripheries thereof, respectively; and first and second linings 15c and 16c bonded to outer peripheries of the first and second rims 15b and 16b, respectively.

An anchor plate 21 serving as a fulcrum at the time of expansion and contraction of the first and second brake shoes 15 and 16 is fixedly installed on the back plate 13 to rotatably support one end portion (lower end portion in this embodiment) of each of the first and second webs 15a and 16a. In addition, the wheel cylinder 17 is fixed to the back plate 13 between the other end portions of the first and second brake shoes 15 and 16 to operate with the output hydraulic pressure of a master cylinder (not shown) operated by a brake pedal to exert a force for driving the first and second brake shoes 15 and 16 to an expansion side through the use of the anchor plate 21 as a fulcrum, and outer end portions of a pair of pistons 20 provided in the wheel cylinder 17 are arranged to be opposed to the other end portions (upper end portions in this embodiment) of the first and second webs 15a and 16a.

A coil spring 22 that urges the one end portions of the first and second webs 15a and 16a to the anchor plate 21 side is provided between the one end portions of the first and second webs 15a and 16a, and a pair of return springs 19 that urge the first and second brake shoes 15 and 16 in a contraction direction are provided between the other end portions of the first and second webs 15a and 16a.

The braking gap automatic adjustment means 18 includes: a contraction position regulating strut 24 which is formed between the first and second webs 15a and 16a included in the first and second brake shoes 15 and 16 and which can be extended by rotation of an adjusting gear 23; an adjusting lever 25 which has a feed claw 25a that is engaged with the adjusting gear 23 and which is rotatable supported by the second web 16a of the second brake shoe 16 of the first and second brake shoes 15 and 16; and an adjusting spring 26 that urges the adjusting lever 25 to rotate to the side on which the adjusting gear 23 rotates in a direction of extending the contraction position regulating strut 24.

The contraction position regulating strut 24 regulates the contraction positions of the first and second brake shoes 15 and 16, and includes: a first rod 27 having a first engaging and coupling portion 27a that is engaged with a position closer to the other end portion of the first web 15a included in the first brake shoe 15 of the first and second brake shoes 15 and 16; a second rod 28 which has a second engaging and coupling portion 28a that is engaged with a position closer to the other end portion of the second web 16a included in the second brake shoe 16 and which is arranged coaxially with the first rod 27; and an adjusting bolt 29 having one end portion that is inserted into the first rod 27 to be relatively movable in an axis direction and having the other end portion that is threadedly engaged with the second rod 28 coaxially. The adjusting gear 23 is formed on an outer periphery of the adjusting bolt 29 to be arranged between the first and second rods 27 and 28.

A first locking recess 30 for engaging the first engaging and coupling portion 27a is formed on a side edge facing the axle 11 side closer to the other end portion of the first web 15a, and a second locking recess 31 for engaging the second engaging and coupling portion 28a is formed on a side edge facing the axle 11 side closer to the other end portion of the second web 16a.

The adjusting lever 25 having the feed claw 25a that is engaged with the adjusting gear 23 is rotatably supported by the second web 16a through the intermediation of a support shaft 32, and the adjusting spring 26 is provided between the second web 16a and the adjusting lever 25. Further, the spring force of the adjusting spring 26 is set to be smaller than the spring force of the return springs 19.

In the braking gap automatic adjustment means 18, at the time of causing the first and second brake shoes 15 and 16 to operate to expand through the operation of the wheel cylinder 17, when the first and second brake shoes 15 and 16 expand by a certain value or more due to the abrasion of the first and second linings 15c and 16c, the adjusting lever 25 rotates about the axis of the support shaft 32 due to the spring force of the adjusting spring 26. As a result, the effective length of the contraction position regulating strut 24 is corrected to be increased in accordance with the rotation of the adjusting gear 23.

Incidentally, the drum brake B includes a parking brake lever 34 capable of generating a parking brake force in accordance with the operation, and the parking brake lever 34 is arranged to overlap with a part of the first web 15a in the first brake shoe 15 in front view (direction illustrated in FIG. 1) in a direction along the rotation axis of the brake drum 14 and is extended long along a longitudinal direction of the first web 15a.

An engaging piece 36 fixed to one end portion of a brake cable 37 is engaged with one end portion (lower end portion in this embodiment) of the parking brake lever 34, and the other end portion (upper end portion in this embodiment) of the parking brake lever 34 is coupled to the other end portion of the first web 15a in the first brake shoe 15 through the intermediation of a pin 35.

When the parking brake of a vehicle operates, the parking brake lever 34 is driven to rotate in a counterclockwise direction of FIG. 1 through the use of the pin 35 as a fulcrum by the pulling force input from the brake cable 37. Due to the rotation of the parking brake lever 34, a force in a direction in which the second lining 16c included in the brake shoe 16 is brought into pressure contact with the inner periphery of the brake drum 14 acts on the second brake shoe 16 via the contraction position regulating strut 24. Further, when the parking brake lever 34 is continuously driven to rotate in the counterclockwise direction of FIG. 1, the parking brake lever 34 rotates through the use of the engagement portion with the first engaging and coupling portion 27a of the contraction position regulating strut 24 as a fulcrum. Then, the first brake shoe 15 operates to expand through the intermediation of the pin 35, and the first lining 15c of the first brake shoe 15 is brought into pressure contact with the inner periphery of the brake drum 14. That is, the parking brake lever 34 operates to an operation position at which the first and second linings 15c and 16c of the first and second brake shoes 15 and 16 are brought into pressure contact with the inner periphery of the brake drum 14, and under this state, a parking brake state is obtained.

In addition, when the application of the rotational drive force to the parking brake lever 34 is stopped by loosening the brake cable 37, the parking brake lever 34 returns to a non-operation position together with the first and second brake shoes 15 and 16 that operate due to the spring force of the return springs 19 in a direction of separating from the inner periphery of the brake drum 14, and the parking brake lever 34 is urged toward the non-operation position side.

Figure 2:
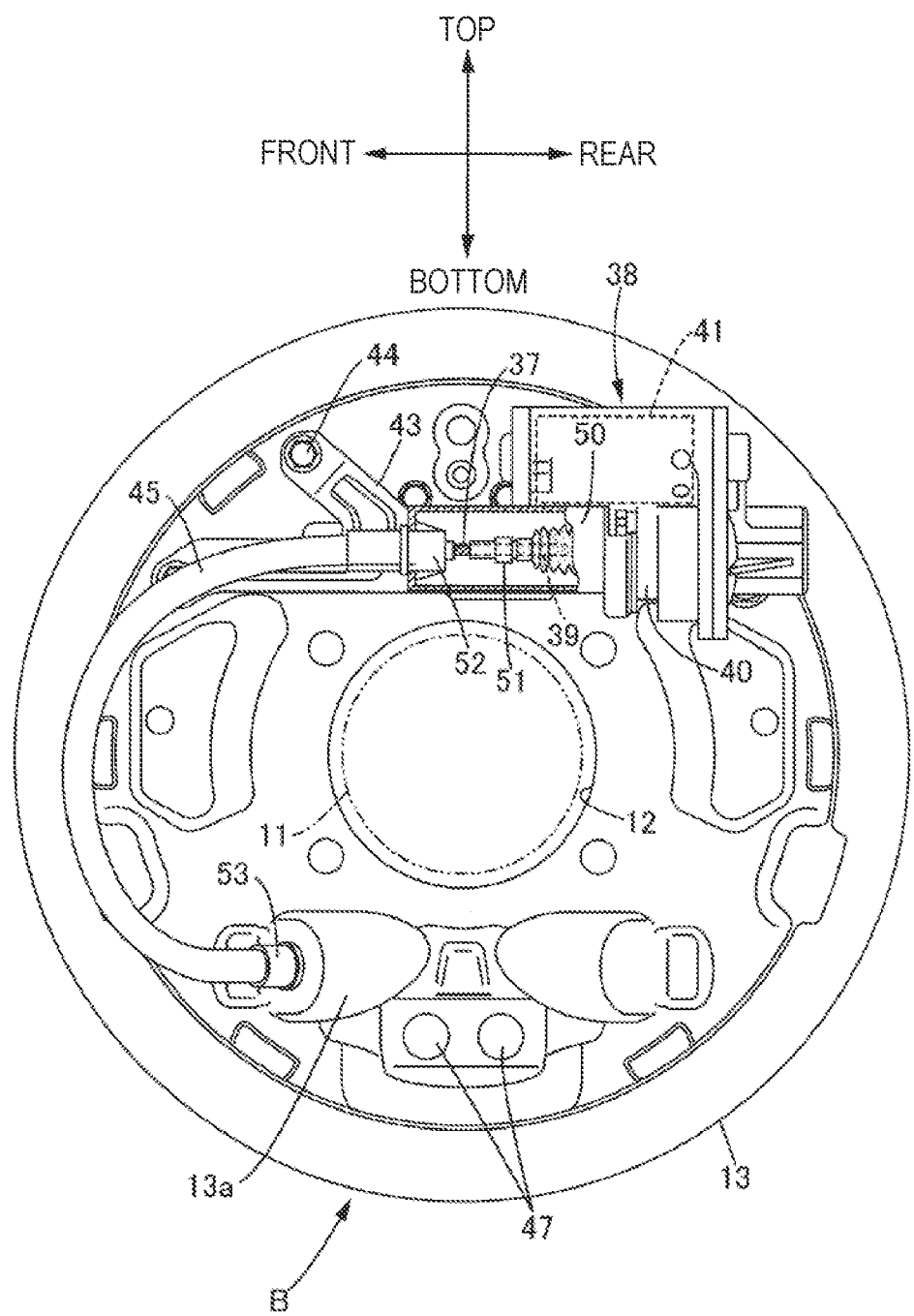
FIG. 2 is a rear view of a drum brake (first embodiment).

Also referring to FIG. 2, the brake cable 37 is pulled by the power exerted by an electric actuator 38, and the electric actuator 38 includes: a screw shaft 39 coupled to the brake cable 37; an actuator case 40 that supports the screw shaft 39 so that the screw shaft 39 can reciprocate in the axis direction while blocking the rotation thereof; an electric motor 41 accommodated in the actuator case 40 to freely rotate in forward and backward directions; and a motion conversion mechanism (not shown) that is accommodated in the actuator case 40 to be provided between the electric motor 41 and the screw shaft 39 while enabling the rotary motion generated in the electric motor 41 to be converted into the linear motion of the screw shaft 39.

The actuator case 40 of the electric actuator 38 is mounted to the back plate 13 on an opposite side of the wheel cylinder 17 through the intermediation of a mounting member 43. The mounting member 43 is fixed to the actuator case 40, and the mounting member 43 is fastened to the back plate 13 with a plurality of, for example, three bolts 44.

The screw shall 39 of the electric actuator 38 is coupled to the brake cable 37 through the intermediation of a cable joint 51, and the coupling portion between the screw shaft 39 and the brake cable 37 is covered with a protective cylinder 50 connected to the actuator case 40.

A tubular portion 13a is integrally provided to project from a front portion along a vehicle front-and-rear direction of a lower portion of the back plate 13, and the brake cable 37 is introduced into the back plate 13 from the tubular portion 13a. In addition, the brake cable 37 is covered with an outer cable 45 formed by winding an iron wire in a coil shape between the protective cylinder 50 and the tubular portion 13a. An end portion of the outer cable 45 on the electric actuator 38 side is mounted to the protective cylinder 50 through the intermediation of a guide tube 52, and an end portion of the outer cable 45 on the back plate 13 side is mounted to the tubular portion 13a through the intermediation of a guide tube 53.

In addition, a holding plate 46 that sandwiches the anchor plate 21 with the back plate 13 is mounted to the lower portion of the back plate 13 with a pair of rivets 47 together with the anchor plate 21 between the one end portions of the first and second webs 15a and 16a, and a guide portion 46a that guides the brake cable 37 together with the outer cable 44 is integrally formed on the holding plate 46 to have a substantially U-shaped transverse sectional shape.

Figure 3:
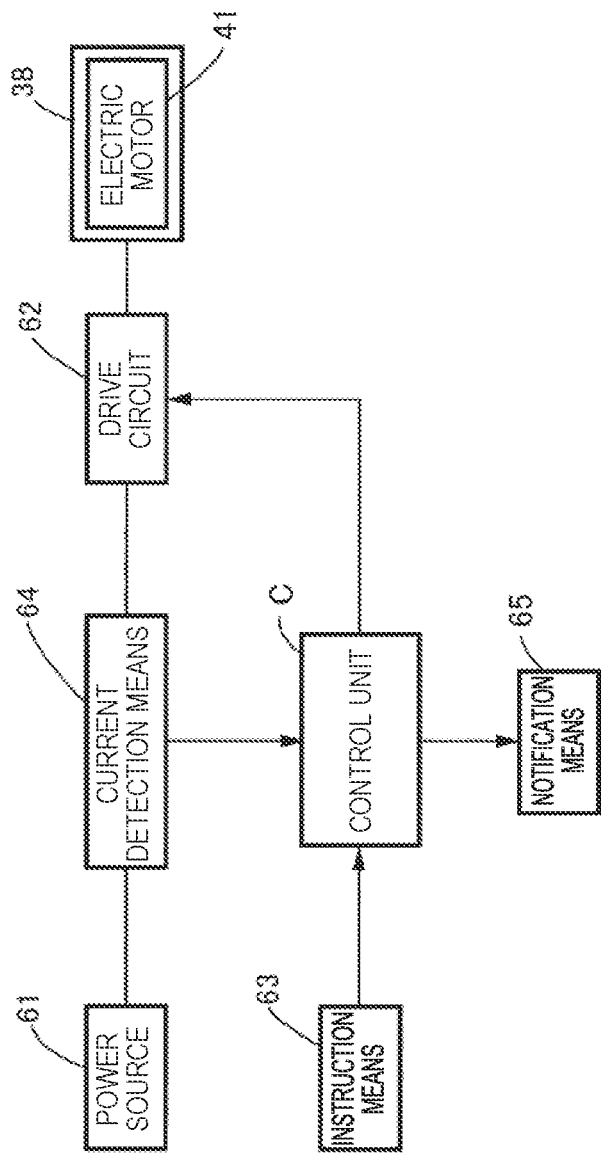
FIG. 3 is a block diagram for illustrating a configuration for controlling an electric actuator (first embodiment).

In FIG. 3, the electric power of a power source 61 is supplied to the electric motor 41 in the electric actuator 38 through a drive circuit 62, and the operation of the electric motor 41, that is, the operation of the drive circuit 62 is controlled by a control unit C. Instruction means 63 for detecting that a vehicle user has performed operation for obtaining the parking brake state by operation of the electric actuator 38 and outputting a signal for obtaining the parking brake state, current detection means 64 for detecting an energization current to the electric motor 41, and notification means 65 for notifying the vehicle user of the results of the abnormality determination of the braking gap automatic adjustment means 18 and the abnormality determination of an inrush current by the control unit C are connected to the control unit C.

Figure 4:
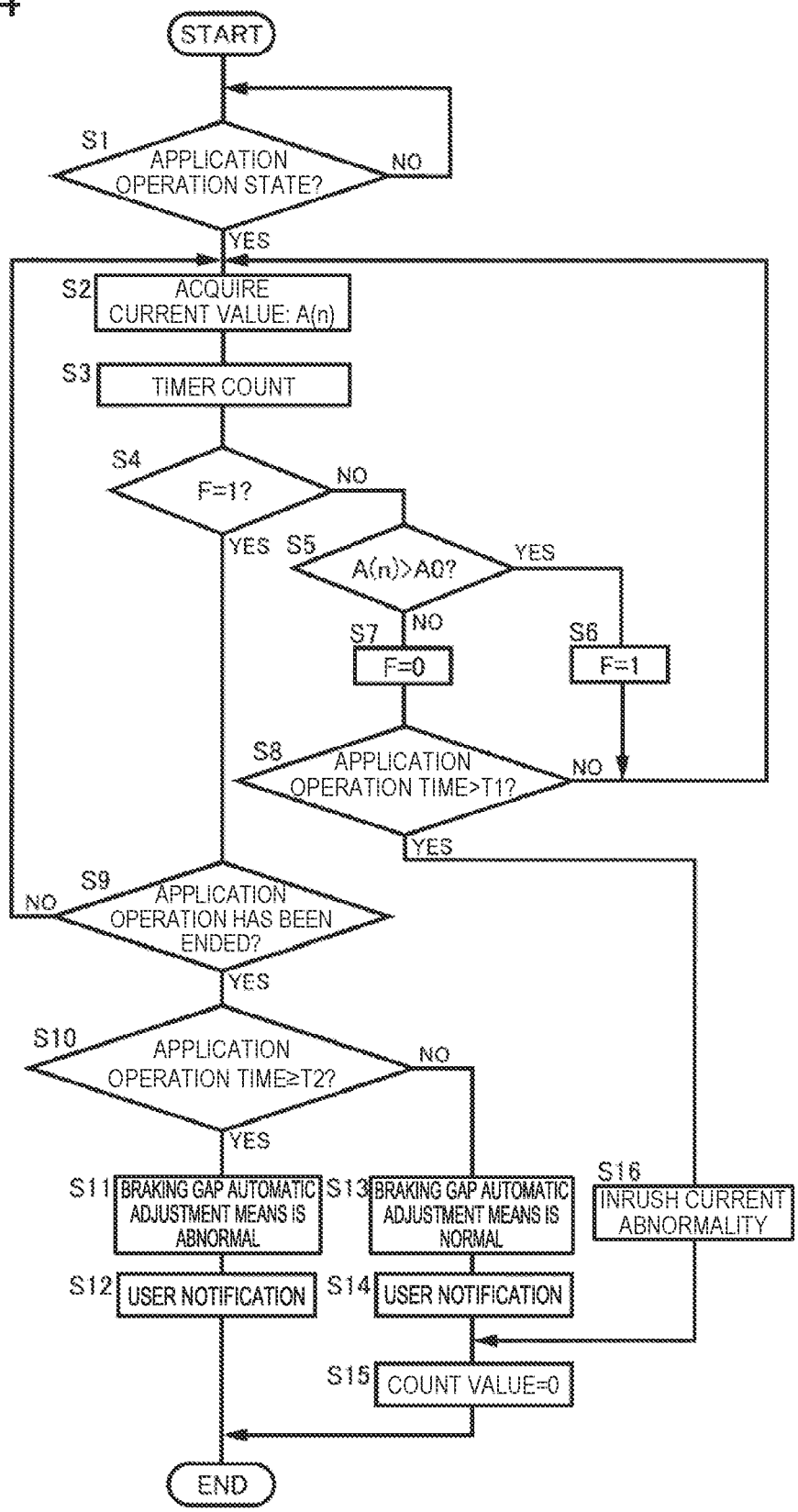
FIG. 4 is a flowchart for illustrating a control process (first embodiment).

At the time of obtaining the parking brake state, the control unit C performs the abnormality determination of the braking gap automatic adjustment means 18 and the abnormality determination of an inrush current in accordance with the process illustrated in FIG. 4. In Step S2 after it is determined in Step S1 that the electric actuator 38 is in an application operation state in which the parking brake state is obtained, a current value A(n) detected by the current detection means 64 is acquired, and the flow proceeds to Step S4 after timer count is performed in Step S3. In Step S4, a determination is made on whether or not a flag F is "1", and the flag F is used for determining whether or not the inrush current generated in response to the start of the operation of the electric actuator 38 is normal. When it is determined that the flag F is "0", the flow proceeds from Step S4 to Step S5, and determination is made on whether or not the detection value by the current detection means 64, that is, the current value A(n) acquired in Step S2 exceeds a predetermined current threshold A0.

Figure 5:
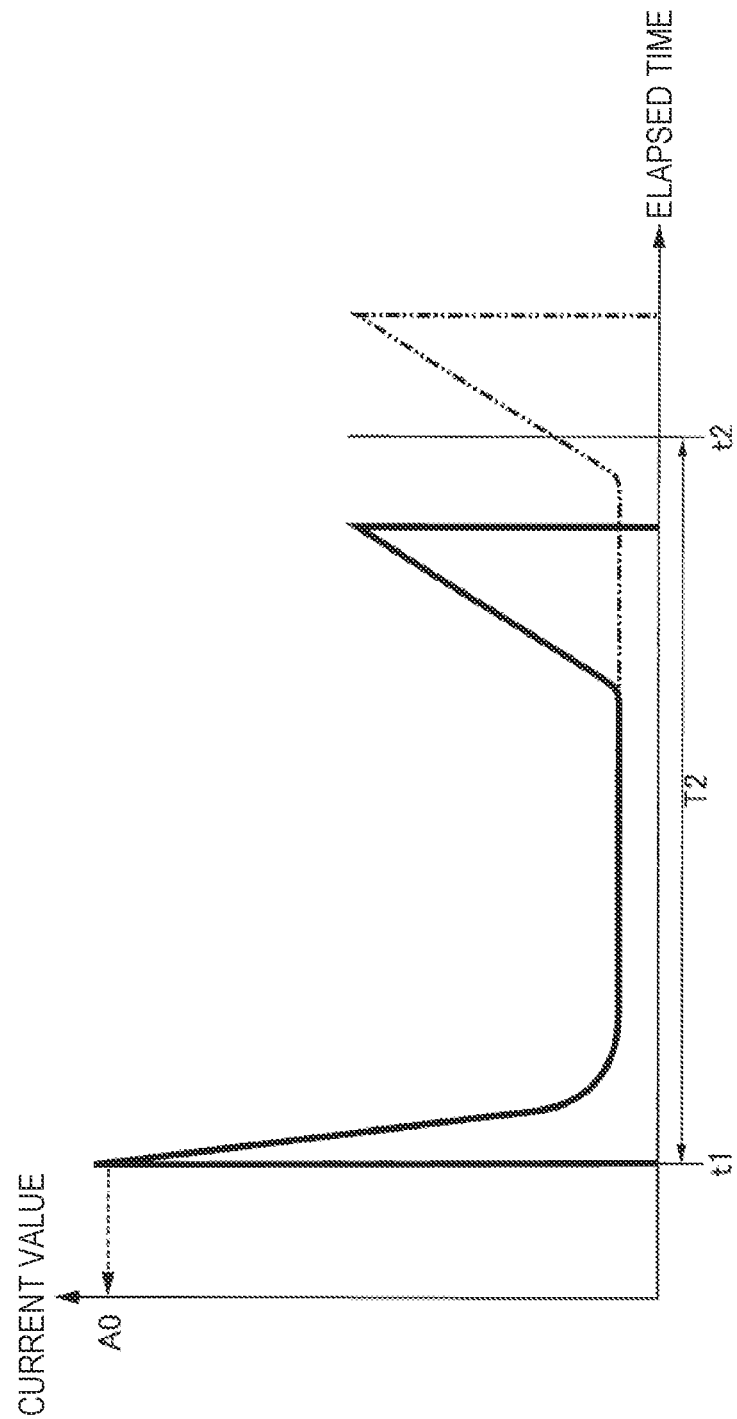
FIG. 5 is a graph for showing an example of a change in current value by the time when a parking brake state is obtained (first embodiment).

More specifically, as shown in FIG. 5, a determination is made on whether or not the inrush current has been normally generated based on whether or not the inrush current generated from an energization start time t1 exceeds the predetermined current threshold A0. When it is confirmed in Step S5 that A(n)>A0 is satisfied, the flow proceeds from Step S5 to Step S6. The flag F is set to "1" assuming that the inrush current has been normally generated, and then the flow returns to Step S2. In addition, it is determined in Step S5 that A(n)≤A0 is satisfied, the flow proceeds from Step S5 to Step S7, and the flag F is set to "0". In the next Step S8, a determination is made on whether or not the application operation time, that is, the elapsed time from the time t1 of FIG. 5 exceeds a predetermined inrush current abnormality determination time T1. When it is determined that the elapsed time is equal to or less than the inrush current abnormality determination time T1, the flow returns to Step S2.

When it is confirmed in Step S4 that the flag F is "1", the flow proceeds from Step S4 to Step S9. Then, a determination is made on whether or not the application operation of the electric actuator 38 has been ended, and the parking brake state has been obtained. The end of the application operation is determined, for example, based on the detection of a current value by the current detection means 64 at a time when the linings 15c and 16c of the pair of brake shoes 15 and 16 are brought into pressure contact with the brake drum 14 due to the forward rotation operation of the electric motor 41, with the result that the rotational load of the electric motor 41 becomes a set value.

When it is determined in Step S9 that the application operation of the electric actuator 38 has not been ended, and the parking brake state has not been obtained, the flow returns to Step S2. When it is determined that the application operation of the electric actuator 38 has been ended, the flow proceeds from Step S9 to Step S10. In Step S10, a determination is made on whether or not the application operation elapsed time of the electric actuator 38 by the time when the parking brake state is obtained has become equal to or more than a predetermined application operation end determination time T2. In Step S10, when it is determined that the application operation elapsed time has become equal to or more than the application operation end determination time T2 from the time t1 to time t2, and the application operation of the electric actuator 38 has been ended, for example, as indicated by the chain line in FIG. 5, it is determined in Step S11 that the braking gap automatic adjustment means 18 is abnormal, and the vehicle user is notified of the determination by the notification means 65 in Step S12.

In addition, when it is determined in Step S10 that the application operation of the electric actuator 38 has been ended with the elapsed time less than the application operation end determination time T2 from the time t1 to the time t2 as indicated by the solid line in FIG. 5, it is determined in Step S13 that the braking gap automatic adjustment means 18 is normal, and the vehicle user is notified of the determination by the notification means 65 in Step S14. Further, in Step S15, a timer count value is set to "0" to initialize the abnormality determination of the braking gap automatic adjustment means 18.

In addition, when it is determined in Step S8 that the state in which the current value A(n) acquired in Step S2 is equal to or less than the current threshold A0 has continued even after the inrush current abnormality determination time T1 under a state in which the inrush current is generated, it is determined in Step S16 that the inrush current is abnormal. Then, the flow proceeds from Step S16 to Step S15, and the timer count value is set to "0" to initialize the abnormality determination of the braking gap automatic adjustment means 18.

Next, the action of this embodiment is described. When the application operation elapsed time of the electric actuator 38 by the time when the parking brake state is obtained has exceeded the predetermined application operation end determination time T2, the control unit C configured to control the operation of the electric actuator 38 capable of exerting power for driving the parking brake lever 34 determines that the braking gap automatic adjustment means 18 is abnormal. As a result, the presence or absence of abnormality in the braking gap automatic adjustment means 18 can be determined at the time of obtaining the parking brake state, and the maintenance of the braking gap automatic adjustment means 18 can be quickly performed.

In addition, the control unit C performs the abnormality determination of the braking gap automatic adjustment means 18 when the detection value A(n) by the current detection means 64 of the inrush current generated in response to the start of the operation of the electric actuator 38 has exceeded the predetermined current threshold A0. As a result, it is possible to perform the abnormality determination of the braking gap automatic adjustment means 18 under a state in which the inrush current is normally generated, and it is possible to differentiate the abnormality determination from the abnormality determination caused by the failure of the electric actuator 38 or the like.

Further, when the detection value by the current detection means 64 of the inrush current is equal to or less than the current threshold A0, and the control unit C determines that the application operation time from the start of the application operation of the electric actuator 38 has exceeded the predetermined inrush current abnormality determination time T1, the control unit C initializes the abnormality determination of the braking gap automatic adjustment means. As a result, it is possible to avoid the abnormality determination of the braking gap automatic adjustment means 18 under a state in which an abnormal inrush current is generated due to the failure of the electric actuator 38 or the like.

The embodiment of the present invention has been described. However, the present invention is not limited to the above-mentioned embodiment. Various changes in design can be made without departing from the scope of the gist of the present invention.

The invention claimed is:

1. An electric parking brake device, comprising:
    a drum brake including:
        braking gap automatic adjuster for automatically adjusting a gap between a pair of brake shoes and a brake drum; and
        a parking brake lever configured to operate between an operation position for obtaining a parking brake state by bringing the pair of brake shoes into slide contact with the brake drum and a non-operation position for releasing the parking brake state;
    an electric actuator configured to exert power for driving the parking brake lever; and
    a control unit configured to control the operation of the electric actuator,
    wherein, when an application operation time of the electric actuator by a time when the parking brake state is obtained has exceeded a predetermined application operation end determination time, the control unit determines that the braking gap automatic adjuster is abnormal.

2. The electric parking brake device according to claim 1, further comprising current detector for detecting an energization current to the electric actuator,
    wherein, when a detection value by the current detector of an inrush current generated in response to the start of the operation of the electric actuator has exceeded a predetermined current threshold, the control unit performs abnormality determination of the braking gap automatic adjuster.

3. The electric parking brake device according to claim 2, wherein, when the detection value by the current detector of the inrush current is equal to or less than the current threshold, and the control unit determines that the application operation time from a start of an application operation of the electric actuator has exceeded a predetermined inrush current abnormality determination time, the control unit initializes the abnormality determination of the braking gap automatic adjuster.

* * * * *